US010359959B1

(12) United States Patent
Hodes et al.

(10) Patent No.: US 10,359,959 B1
(45) Date of Patent: Jul. 23, 2019

(54) ENERGY OPTIMIZED POWER STATE DECLARATIONS FOR SOLID STATE DRIVES

(71) Applicant: Western Digital Technologies, Inc., San Jose, CA (US)

(72) Inventors: Avichay Haim Hodes, Kfar Ben-Nun (IL); Alex Mostovoy, Dublin, CA (US); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/913,581

(22) Filed: Mar. 6, 2018

(51) Int. Cl.
*G06F 3/06* (2006.01)

(52) U.S. Cl.
CPC .......... *G06F 3/0632* (2013.01); *G06F 3/0604* (2013.01); *G06F 3/0625* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| 5,481,733 | A  | * | 1/1996  | Douglis  | G06F 1/3221 713/321 |
| 2010/0164292 | A1 | * | 7/2010  | Freeman  | G06F 1/263 307/80 |
| 2011/0173474 | A1 | * | 7/2011  | Salsbery | G06F 1/206 713/323 |
| 2017/0285722 | A1 | * | 10/2017 | Kim      | G06F 1/3296 |

OTHER PUBLICATIONS

U.S. Appl. No. 15/878,735, filed Jan. 24, 2018.

* cited by examiner

*Primary Examiner* — Kevin Verbrugge
(74) *Attorney, Agent, or Firm* — Patterson & Sheridan, LLP; Steven Versteeg (57) ABSTRACT

A solid state device is disclosed comprising an array of memory units, an interface connected to the memory units, at least one arrangement to monitor a temperature of the solid state device and an arrangement to monitor low power mode statistics of the solid state device and compare the low power mode statistics to a critical usage point power threshold at a temperature measured, wherein the arrangement to monitor the low power mode statistics of the solid state device is further configured to change a power mode of the solid state device based upon the low power mode statistics.

26 Claims, 3 Drawing Sheets

ENERGY OPTIMIZED POWER STATE DECLARATIONS FOR SOLID STATE DRIVES

FIELD OF THE DISCLOSURE

Aspects of the disclosure relate to computer systems. More specifically, aspects of the disclosure relate to improved power management and power management strategies for host connected devices.

BACKGROUND INFORMATION

Field

Power usage of components is an important parameter in computing systems. As computing systems may be mobile, computer architects try to minimize usage of power for different computer systems to allow the computer system greater amounts of time to operate independently.

Conventional computer designs and methods of operation merely call for taking computer components and placing these computer components in their lowest electrical usage state, thereby hoping to minimize the amount of electrical energy drawn from the host computer. Conventional systems, however, do not take into account other parameters that impact the overall electrical usage of a computer system.

Conventional systems do not take into account energy usage of computer components, such as a solid state drive, when the drive transitions from one power state of usage to another. For example, when a solid state drive transitions from a light throttling state to a heavy throttling state, there is a cost in terms of energy to accomplish the transition. As a result, simply placing the solid state drive into the lowest potential operation state can mean many transitions if the solid state drive is active in a periodic fashion. With every transition between power states, the more electrical energy is used, without overall benefit.

The cost of transitioning from one power state to another in a computer component may be more costly in terms of energy usage than keeping the computer component at a certain state. Conventional computer operation methods and designs do not account for such realities. There is a need, therefore, to provide a computer system that more efficiently uses energy compared to conventional systems.

There is an additional need to provide a computer system that may monitor computer electrical usage and accurately forecast energy usage compared to conventional systems.

There is a further need to provide a computer system that accounts to energy usage during transitions between operating system that conventional computer systems neglect.

SUMMARY

So that the manner in which the above recited features of the present disclosure can be understood in detail, a more particular description of the disclosure, briefly summarized below, may be had by reference to embodiments, some of which are illustrated in the appended drawings. It is to be noted that the appended drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a solid state device is disclosed comprising an array of memory units configured to store data, an interface connected to the memory units, wherein the interface is configured to allow transfer of data to and from the array of memory units, at least one arrangement to monitor a temperature of the solid state device and an arrangement to monitor low power mode statistics of the solid state device and compare the low power mode statistics to a critical usage point power threshold at a temperature measured, wherein the arrangement to monitor the low power mode statistics of the solid state device is further configured to change a power mode of the solid state device based upon the low power mode statistics.

In another non-limiting embodiment, a method for changing a mode of a solid state device connected to a host is disclosed comprising one of entering an active mode and operating the solid state device in an active mode, accumulating statistics of the solid state device during operation in the active mode, calculating a frequency of usage of the solid state drive, comparing the frequency of usage of the solid state drive to a critical point, updating a power state table for the solid state device with statistics of the solid state device when the frequency of usage of the solid state drive is greater than the critical point, returning to the one of entering the active mode and operating the solid state device in the active mode when the frequency of usage of the solid state drive is greater than the critical point and entering a low power mode for the solid state device when the frequency of usage of the solid state device is less than the critical point.

In another non-limiting embodiment, an apparatus for conducting a method for changing a mode of a solid state device connected to a host is disclosed comprising means for one of entering an active mode and operating the solid state device in an active mode, means for accumulating statistics of the solid state device during operation in the active mode, means for calculating a frequency of usage of the solid state drive, means for comparing the frequency of usage of the solid state drive to a critical point, means for updating a power state table for the solid state device with statistics of the solid state device when the frequency of usage of the solid state drive is greater than the critical point, means for returning to the one of entering the active mode and operating the solid state device in the active mode when the frequency of usage of the solid state drive is greater than the critical point and means for entering a low power mode for the solid state device when the frequency of usage of the solid state device is less than the critical point.

In another non-limiting embodiment, an apparatus for changing a mode of a solid state device is disclosed comprising means for at least one of entering an active mode and operating the solid state device in an active mode, means for measuring and accumulating solid state drive operational statistics, means for calculating a solid state drive usage frequency, means for comparing the usage frequency of usage to a critical point, means for updating a solid state device power state table with statistics measured and accumulated for the solid state device when the usage frequency is greater than the critical point, means for returning to the solid state device to the active mode and means for entering a low power mode for the solid state device.

In another non-limiting embodiment, a solid state device, comprising at least one memory unit configured to store data, an interface connected to the at least one memory unit, wherein the interface is configured to allow transfer of data to and from the array of memory units and an arrangement to monitor low power mode statistics of the solid state device and compare low power mode statistics to a critical usage point power threshold, wherein the arrangement to monitor the low power mode statistics of the solid state device is further configured to change a power mode of the solid state device based upon the low power mode statistics.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim. Likewise, reference to "the disclosure" shall not be construed as a generalization of an inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage and specifically, performing monitoring and control of power operations and power states of a storage device that is connected to a computer host. In the embodiments described, a data storage arrangement is connected to the host system. The function of the data storage arrangement is to accept data and store the data until needed again by a user or the host. The data storage arrangement may be configured to accept bursts of data, depending on the computer process performed, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host. The interface may be a SAS Interface or Serial ATA (SATA) compatible interface, as a non-limiting embodiments. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SATA compatible, other types of interfaces may be used.

Auxiliary connections may be provided to the data storage arrangement to allow for additional options for inputting data directly to the data storage arrangement without interfacing with the host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use. The controller may also provide control functions for entry and exit of different power states of the data storage arrangement. Through action of the controller, therefore, electrical energy may be saved by the controller preventing inappropriate access to different power states when such access would cost a greater amount of lost energy than operation in a different power state.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability. The internal software may be updated such that different values associated with power states for the data storage arrangement can be input for more accurate representation of power states and power usage values for the data storage arrangement.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities from 16 GB to 8 TB may be provided, as non-limiting embodiments. Different form factors may also be provided. In the illustrated embodiment, a form factor of 2.5 inches is provided. Other form factors such as 1.8 inch or 3.5 inch may also be used. M.2 form factors may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

The aspects of the description apply to computers and more specifically, aspects of controlling computers or computer connected devices such that the devices perform in an optimal method of operation, such a minimizing the overall use of electrical energy for activities. Data storage arrangements may be, for example, disk drives, hybrid disk drive, NAND flash units and other similar arrangements.

Figure 1:
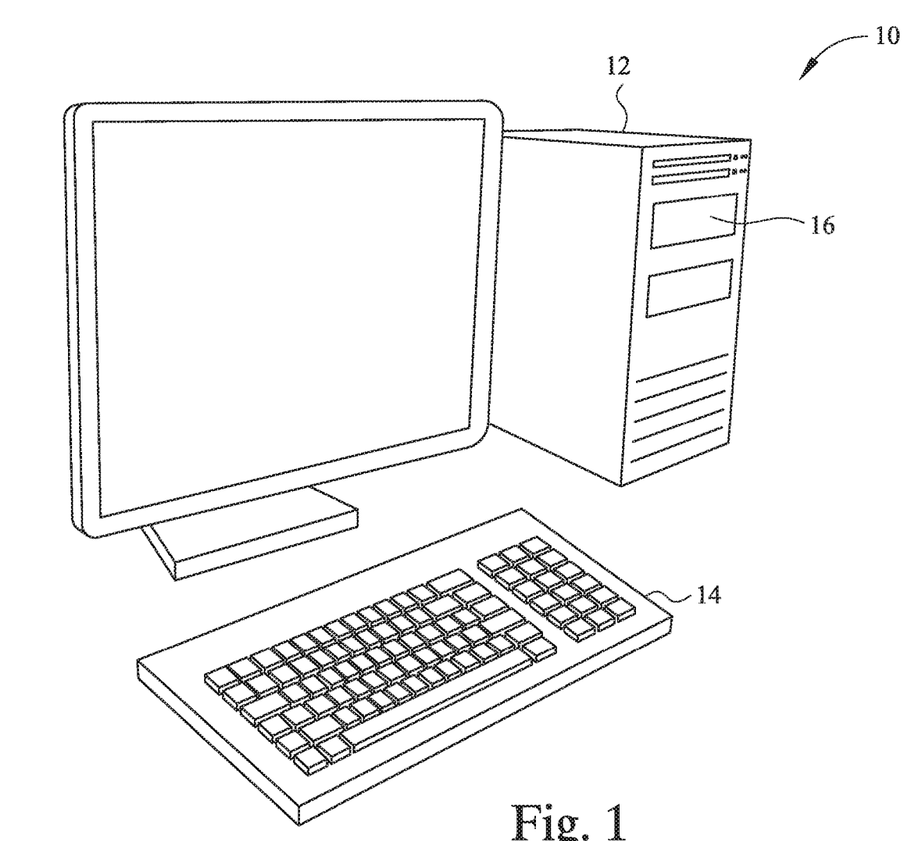
FIG. 1 is a diagram of a host and connected solid state drive.

Regarding FIG. 1, an illustration of a host and device configuration 10 is provided. The host 12 is a computer that is provided with an interface 14 to allow a user to interact with the host 12. The interface 14 may be a keyboard and monitor system as a non-limiting embodiment. The host 12 provides a computing arrangement that allows for input, retention and output of information, as desired, from the request of a user. The device 16, is an arrangement that provides for retention of information. In the illustrated embodiment, the device 16 is a non-volatile memory device, such as a NAND flash unit. The device 16 may have a host interface which is configured to interface with the host 12 to allow the device 16 to be addressable by the host 12.

The host 12 may have several configurations and the illustration provided is but one example embodiment. The host 12 may have a serial port, a parallel port, a firewire connection, Ethernet connection and/or multiple universal serial bus devices (USB's). The host 12 may have a processor that allows for computation of required processes. Video output may be provided such that a user can identify the results of processor actions. The output may be through a connected universal serial bus device or dedicated video output, through, for example, a video card and video monitor. The host 12 may also be provided with a printer output port to allow for printed output of the materials calculated.

The host 12 may also be provided with other input/output devices, such as a mouse, camera or other similar components. In the non-limiting embodiment, the host 16 is configured as a stand-alone unit. Such a stand-alone unit may be a laptop computer or may be a desktop computer unit. The host 12 may also be provided with an additive connection feature, such as a server/rack system. The host 12 may be one component in such a server and rack system.

The host 12 may be configured such that it is self-powered and can provide power to the other components attached to the host 12. In the illustrated embodiment, the host 12 is configured with the ability to provide power to the device 16.

In the aspects described herein, the host 12 and the device 16 are operated and configured in which the device dynamically changes its declared and actual power states in accordance with optimal transitional energy.

Data is derived by profiling actual energy usage over time. Such data may be operating speed, temperature management, fan/cooling operation measurement, read/write activity, as non-limiting embodiments. While transitioning to low power, the device measures and accumulates statistics of low power mode transitions, as well as the actual energy expended in each transition. The measurements may be performed through, for example, direct measurements of the parameters involved as well as complete sub-systems that are configured to measure parameters, such as temperature and/or humidity modules. After data is accumulated, a critical point is established for each power mode (PS0 through PS4). For purposes of definition, the critical point is the point at which a transition is inefficient from a power perspective. Once a critical point is established, the power state table is dynamically modified in order to allow for the equation of (ENLAT*(previous power state max average)) used by the host to reflect the actual transitional energy used.

As described above, a common method in non-volatile memory (NVMe) (used by Intel RST device driver in Windows and Linux drivers) is to read a power state table provided by the device and set power state transitions based on the entry and/or exit latencies declared by the device. The host computer does not take into account transitional energy but assumes that the cost of transitioning between the power states is the max average active power defined by the last operational state, multiplied by the entry latency of the new power state. For example, below is an example of a partial power state table with typical power states used by a consumer NVMe device:

TABLE 1

| Power State | Entry Latency | Exit Latency | Max Avg. Power |
|---|---|---|---|
| PS0 (Active) | | | 5.5 W |
| PS1 (Light Throttling) | | | 3 W |
| PS2 (Heavy Throttling) | | | 1.9 W |
| PS3 (Slumber) | 2 ms | 10 ms | 70 mW |
| PS4 (Deep Sleep) | 1000 ms | 100 ms | 2 mW |

The transitional energy assumed by the host in a transition from PS0 to PS4 would be 5500 mJ (5.5 W×(1000 ms$^{Entry}$+ 100 ms$^{exit}$). The actual cost may be higher or lower depending on the factors described above. Max average power is derived from a sequential write workload, and the actual workload used during a power state transition may be more random and/or more CPU-intensive. Entry latency may also be affected by the triggering of background operations, which may exceed the declared entry latency when Permissive Mode is enabled on the device. Max transitional energy for a power state is composed of both the Entry power and the Exit power, therefore moving from PS0 to PS4 can take a maximum power of 5.5 W×(1000 ms+100 ms).

A second common approach (used by the Microsoft NVMe driver) is to use a power based only on Exit and Entry latencies, ignoring any transitional power related to each one of the power state. The transitional energy assumptions, based on the above-identified features, may impact the overall efficiency of the system.

Figure 2:
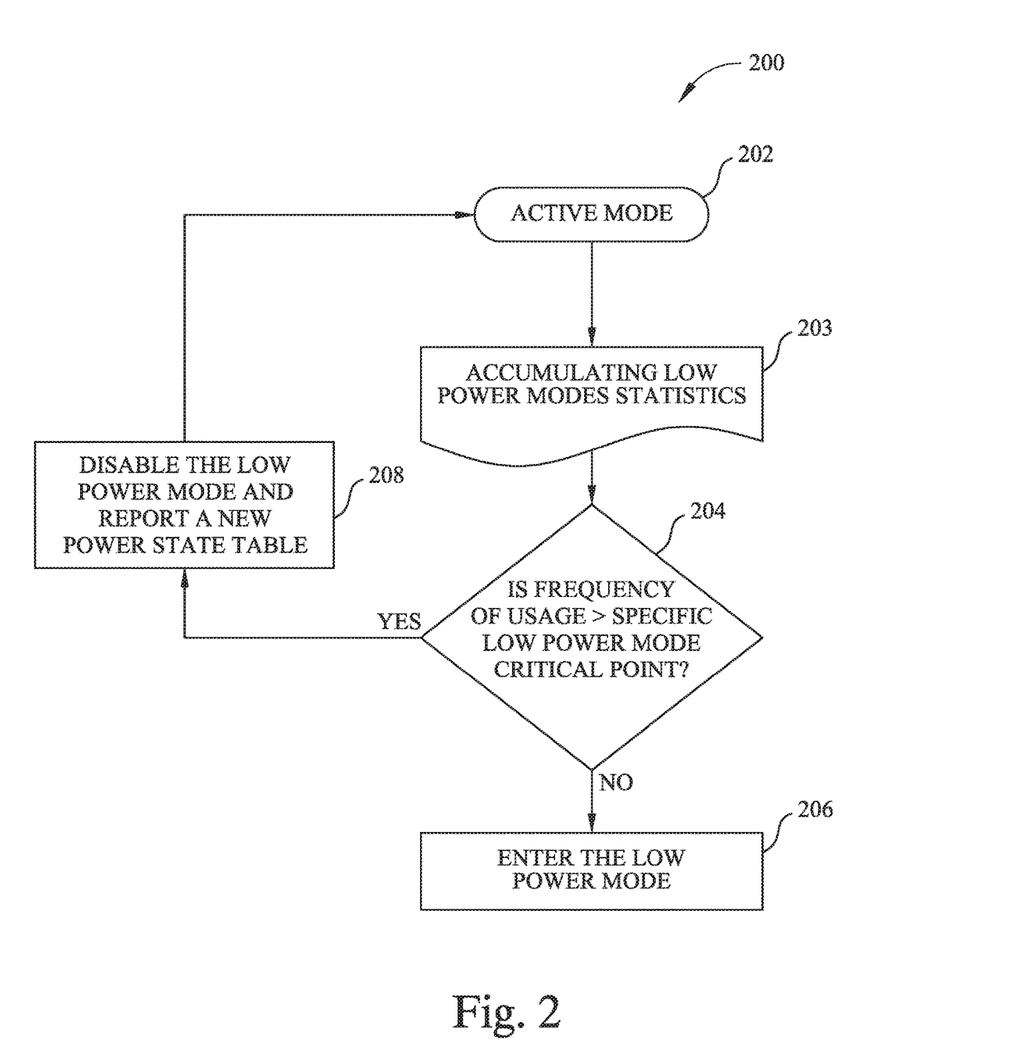
FIG. 2 is a flow chart of a method wherein a device dynamically changes a declared and actual power state in accordance with an optimal transition energy.

It is desired to provide a method and device that will provide for accurate use of energy of the device. In a first embodiment, a method is provided to provide for flexibility of use of a host connected device, while conserving energy. In the method 200 provided, the device, such as a solid state drive that may be connected to a host system, may be in placed into an active state 202. In the illustrated embodiment, the solid state drive is in an active mode and placed into a low power mode. The method proceeds to 203 wherein low power mode statistics are accumulated. The accumulation occurs during operating periods of the solid state drive. Among the statistics accumulated may be entries and the times of such entries. A ratio of Entries/Time may also be calculated. The method proceeds to 204 wherein a query is performed to determine if a frequency of usage is greater than a specific lower power mode critical point. If the frequency of usage is not greater than the specific low power mode critical point, then the method proceeds to 206 wherein a low power mode is entered. If the frequency of usage is greater than the specific low power mode critical point, then the method proceeds to 208 wherein the low power mode is disabled and a report is made to the power state table.

Figure 3:
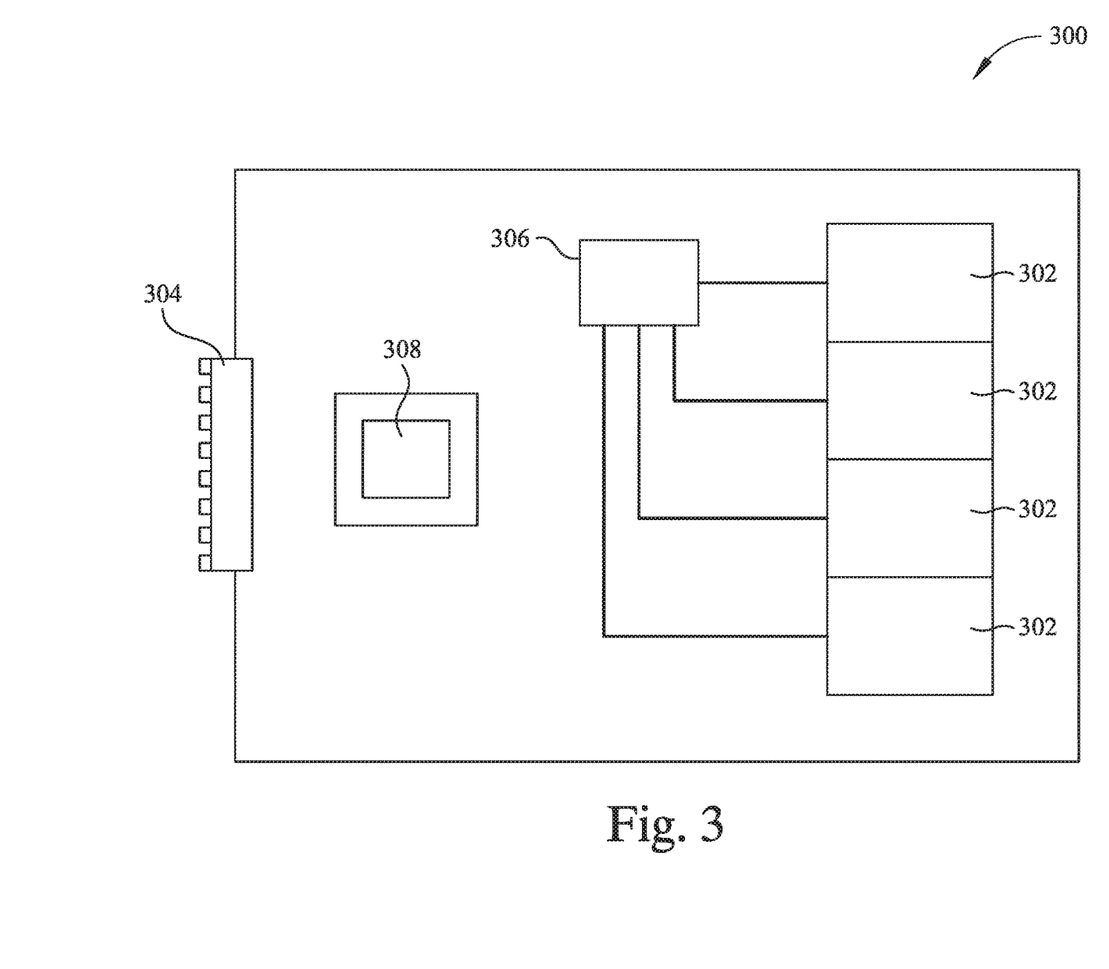
FIG. 3 is a schematic diagram of a solid state drive.

Referring to FIG. 3, a device 300 is illustrated for storing information. The device 300 has component parts of an array of memory units 302 that may be used for storing the data/information required. An interface 304 is provided such that the device 300 may send and receive information to a host, such as a computer. An arrangement for measuring a temperature 306, such as at each of the components of the array of memory units 302 is provided. A further arrangement for monitoring power conditions 308 is provided. The arrangement for monitoring power conditions 308 may monitor power flow in and out of the differing components of the device 300 to enable a user to ascertain how much power is being used. The arrangement for monitoring power conditions 308 may also be have a memory to allow for storage of optimum power conditions for the differing components of the device 300. As the components age, the efficiency of the components may be affected, therefore the amount of optimal power usage may change over time.

In one non-limiting embodiment, a solid state device is disclosed comprising an array of memory units configured to store data, an interface connected to the memory units, wherein the interface is configured to allow transfer of data to and from the array of memory units, at least one arrangement to monitor a temperature of the solid state device and an arrangement to monitor low power mode statistics of the solid state device and compare the low power mode statistics to a critical usage point power threshold at a temperature measured, wherein the arrangement to monitor the low power mode statistics of the solid state device is further configured to change a power mode of the solid state device based upon the low power mode statistics.

In another non-limiting embodiment, the solid state device may be configured wherein the array of memory units is a non-volatile memory.

In a still further embodiment, the solid state device may be configured wherein the non-volatile memory is a NAND flash unit.

In a still further embodiment, a method for changing a mode of a solid state device connected to a host, comprising: one of entering an active mode and operating the solid state device in an active mode, accumulating statistics of the solid state device during operation in the active mode, calculating a frequency of usage of the solid state drive, comparing the frequency of usage of the solid state drive to a critical point, updating a power state table for the solid state device with statistics of the solid state device when the frequency of usage of the solid state drive is greater than the critical point, returning to the one of entering the active mode and operating the solid state device in the active mode when the frequency of usage of the solid state drive is greater than the critical point and entering a low power mode for the solid state device when the frequency of usage of the solid state device is less than the critical point.

In another embodiment, the method may be accomplished wherein the active mode is a low power mode.

In another embodiment, the method may be accomplished wherein the statistics are power related statistics for the solid state device.

In another embodiment, the method may be accomplished wherein the updating the power state table for the solid state device with statistics of the solid state device when the frequency of usage of the solid state drive is greater than the critical point includes disabling the low power mode.

In another embodiment, the method may be accomplished wherein the accumulating statistics of the solid state device during operation in the active mode includes accumulating statistics on entry and time of presence of the solid state device in an operating mode.

In another embodiment, the method may be accomplished further comprising calculating a ratio of number of entries for a power state divided by time of presence in the power state.

In another embodiment, the method may be accomplished wherein the frequency of usage is defined by the ratio of number of entries for a power state divided by time of presence in the power state.

In another embodiment, the method may be accomplished wherein the solid state device is one of a computer disk drive, a hybrid drive and a solid state drive.

In another embodiment, the method may be accomplished wherein the host is a computer.

In another embodiment, the method may be accomplished wherein the updating the power state table for the solid state device with statistics of the solid state device when the frequency of usage of the solid state drive is greater than the critical point is within the controller for the solid state device.

An apparatus for conducting a method for changing a mode of a solid state device connected to a host, comprising: means for one of entering an active mode and operating the solid state device in an active mode, means for accumulating statistics of the solid state device during operation in the active mode, means for calculating a frequency of usage of the solid state drive, means for comparing the frequency of usage of the solid state drive to a critical point, means for updating a power state table for the solid state device with statistics of the solid state device when the frequency of usage of the solid state drive is greater than the critical point, means for returning to the one of entering the active mode and operating the solid state device in the active mode when the frequency of usage of the solid state drive is greater than the critical point and means for entering a low power mode for the solid state device when the frequency of usage of the solid state device is less than the critical point.

In another non-limiting embodiment, the apparatus may be configured wherein the active mode is a low power mode.

In another non-limiting embodiment, the apparatus may be configured wherein the statistics are power related statistics for the solid state device.

In another non-limiting embodiment, the apparatus may be configured wherein the updating the power state table for the solid state device with statistics of the solid state device when the frequency of usage of the solid state drive is greater than the critical point includes disabling the low power mode.

In another non-limiting embodiment, the apparatus may be configured wherein the accumulating statistics of the solid state device during operation in the active mode includes accumulating statistics on entry and time of presence of the solid state device in an operating mode.

In another non-limiting embodiment, the apparatus may be configured to further comprise means for calculating a ratio of number of entries for a power state divided by time of presence in the power state.

In another non-limiting embodiment, the apparatus may be configured wherein the frequency of usage is defined by the ratio of number of entries for a power state divided by time of presence in the power state.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A solid state device, comprising:
    an array of memory units configured to store data;
    an interface connected to the memory units, wherein the interface is configured to allow transfer of data to and from the array of memory units;
    at least one arrangement to monitor a temperature of the solid state device; and
    an arrangement to monitor low power mode statistics of the solid state device and compare the low power mode statistics to a critical usage point power threshold at a temperature measured, wherein the arrangement to monitor the low power mode statistics of the solid state device is further configured to change a power mode of the solid state device based upon the low power mode statistics.

2. The solid state device according to claim 1, wherein the array of memory units is a non-volatile memory.

3. The solid state device according to claim 2, wherein the non-volatile memory is a NAND flash unit.

4. A method for changing a mode of a solid state device connected to a host, comprising:
    one of entering an active mode and operating the solid state device in an active mode;

accumulating statistics of the solid state device during operation in the active mode;
calculating a frequency of usage of the solid state drive;
comparing the frequency of usage of the solid state drive to a critical point;
updating a power state table for the solid state device with statistics of the solid state device when the frequency of usage of the solid state drive is greater than the critical point;
returning to the one of entering the active mode and operating the solid state device in the active mode when the frequency of usage of the solid state drive is greater than the critical point; and
entering a low power mode for the solid state device when the frequency of usage of the solid state device is less than the critical point.

5. The method according to claim 4, wherein the active mode is a low power mode.

6. The method according to claim 5, wherein the statistics are power related statistics for the solid state device.

7. The method according to claim 5, wherein the updating the power state table for the solid state device with statistics of the solid state device when the frequency of usage of the solid state drive is greater than the critical point includes disabling the low power mode.

8. The method according to claim 4, wherein the accumulating statistics of the solid state device during operation in the active mode includes accumulating statistics on entry and time of presence of the solid state device in an operating mode.

9. The method according to claim 8, further comprising:
calculating a ratio of number of entries for a power state divided by time of presence in the power state.

10. The method according to claim 9, wherein the frequency of usage is defined by the ratio of number of entries for a power state divided by time of presence in the power state.

11. The method according to claim 4, wherein the solid state device is one of a computer disk drive, a hybrid drive and a solid state drive.

12. The method according to claim 4, wherein the host is a computer.

13. The method according to claim 4, wherein the updating the power state table for the solid state device with statistics of the solid state device when the frequency of usage of the solid state drive is greater than the critical point is within the controller for the solid state device.

14. An apparatus for conducting a method for changing a mode of a solid state device connected to a host, comprising:
means for one of entering an active mode and operating the solid state device in an active mode;
means for accumulating statistics of the solid state device during operation in the active mode;
means for calculating a frequency of usage of the solid state drive;
means for comparing the frequency of usage of the solid state drive to a critical point;
means for updating a power state table for the solid state device with statistics of the solid state device when the frequency of usage of the solid state drive is greater than the critical point;
means for returning to the one of entering the active mode and operating the solid state device in the active mode when the frequency of usage of the solid state drive is greater than the critical point; and
means for entering a low power mode for the solid state device when the frequency of usage of the solid state device is less than the critical point.

15. The apparatus according to claim 14, wherein the active mode is a low power mode.

16. The apparatus according to claim 15, wherein the statistics are power related statistics for the solid state device.

17. The apparatus according to claim 15, wherein the updating the power state table for the solid state device with statistics of the solid state device when the frequency of usage of the solid state drive is greater than the critical point includes disabling the low power mode.

18. The apparatus according to claim 14, wherein the accumulating statistics of the solid state device during operation in the active mode includes accumulating statistics on entry and time of presence of the solid state device in an operating mode.

19. The apparatus according to claim 14, further comprising:
means for calculating a ratio of number of entries for a power state divided by time of presence in the power state.

20. The apparatus according to claim 19, wherein the frequency of usage is defined by the ratio of number of entries for a power state divided by time of presence in the power state.

21. An apparatus for changing a mode of a solid state device, comprising:
means for at least one of entering an active mode and operating the solid state device in an active mode;
means for measuring and accumulating solid state drive operational statistics;
means for calculating a solid state drive usage frequency;
means for comparing the usage frequency of usage to a critical point;
means for updating a solid state device power state table with statistics measured and accumulated for the solid state device when the usage frequency is greater than the critical point;
means for returning to the solid state device to the active mode; and
means for entering a low power mode for the solid state device.

22. The apparatus according to claim 21, wherein the means for entering the low power mode for the solid state device is when the frequency of usage of the solid state device is less than the critical point.

23. A solid state device, comprising:
at least one memory unit configured to store data;
an interface connected to the at least one memory unit, wherein the interface is configured to allow transfer of data to and from the array of memory units; and
an arrangement to monitor low power mode statistics of the solid state device and compare low power mode statistics to a critical usage point power threshold, wherein the arrangement to monitor the low power mode statistics of the solid state device is further configured to change a power mode of the solid state device based upon the low power mode statistics.

24. The solid state device according to claim 23, further comprising:
a temperature monitoring arrangement configured to measure an internal temperature of the solid state device during operation.

25. The solid state device according to claim 23, wherein the at least one memory unit is a NAND flash unit.

26. The solid state device according to claim 25, wherein the at least one memory unit is an array of NAND flash units.

* * * * *